United States Patent
Moher

(10) Patent No.: US 9,966,983 B2
(45) Date of Patent: May 8, 2018

(54) INTERFERENCE CANCELLATION IN MIMO SAME CHANNEL FULL-DUPLEX TRANSCEIVERS

(71) Applicant: Huawei Technologies Co., Ltd., Shenzhen (CN)

(72) Inventor: Michael Moher, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 14/461,224

(22) Filed: Aug. 15, 2014

(65) Prior Publication Data

US 2016/0049972 A1    Feb. 18, 2016

(51) Int. Cl.
| | |
|---|---|
| *H04B 1/12* | (2006.01) |
| *H04L 5/14* | (2006.01) |
| *H04B 1/04* | (2006.01) |
| *H04B 1/525* | (2015.01) |
| *H04B 7/0413* | (2017.01) |

(52) U.S. Cl.
CPC ............ *H04B 1/12* (2013.01); *H04B 1/0475* (2013.01); *H04B 1/525* (2013.01); *H04L 5/14* (2013.01); *H04B 7/0413* (2013.01)

(58) Field of Classification Search
CPC .......... H04B 1/12; H04B 7/0413; H04B 3/20; H04L 5/14; H04L 25/22; H04W 52/42
See application file for complete search history.

(56) References Cited

U.S. PATENT DOCUMENTS

| | | | | |
|---|---|---|---|---|
| 7,817,641 B1* | 10/2010 | Khandani | ............ | H04B 7/0682 370/395.4 |
| 2008/0165874 A1 | 7/2008 | Steele et al. | | |
| 2011/0293028 A1* | 12/2011 | Panicker | .............. | H04J 11/0036 375/260 |

(Continued)

FOREIGN PATENT DOCUMENTS

| | | |
|---|---|---|
| CN | 101627672 A | 1/2010 |
| CN | 102035768 A | 4/2011 |

OTHER PUBLICATIONS

Bharadia et al. "Full Duplex Radios" Proceedings of the ACM SIGCOMM 2013 conference on SIGCOMM pp. 375-386, Aug. 12-16, 2013.*

(Continued)

*Primary Examiner* — Alex Skripnikov
(74) *Attorney, Agent, or Firm* — Slater Matsil, LLP

(57) ABSTRACT

Same-channel full-duplex communications can be adapted for multiple-input multiple-output (MIMO) processing in order to derive increased signal performance through the exploitation of spatial diversity. Strong interference components from transmissions over multiple local antennas can be removed from a received radio signal to allow array and diversity gain benefits of MIMO to be enjoyed in same-channel full-duplex communications. More specifically, baseband samples of two or more MIMO transmission signals may be used to perform channel estimation on a received radio signal by correlating the baseband signals with the radio signal to estimate interference channels associated with the MIMO transmission signals. The estimated interference channels are used to subtract corresponding interference components from the received radio signals.

21 Claims, 8 Drawing Sheets

(56) References Cited

U.S. PATENT DOCUMENTS

| | | | |
|---|---|---|---|
| 2013/0051505 A1 | 2/2013 | Singh et al. | |
| 2013/0201857 A1* | 8/2013 | Bhargava | H04K 3/222 370/252 |
| 2013/0301487 A1* | 11/2013 | Khandani | H04W 16/14 370/278 |
| 2014/0056331 A1 | 2/2014 | Nair et al. | |
| 2014/0198691 A1* | 7/2014 | Oberhammer | H04B 15/00 370/281 |
| 2015/0124911 A1* | 5/2015 | Wicker, Jr. | H04L 25/0242 375/340 |
| 2016/0226653 A1* | 8/2016 | Bharadia | H04L 5/1461 |

OTHER PUBLICATIONS

International Search Report and Written Opinion received in International Application No. PCT/CN2015/086427 dated Nov. 18, 2015, 10 pages.

Haykin, S., (1991) "Least-Mean-Square Algorithm," Adaptive Filter Theory, Chapter 9, 3rd ed., Prentice-Hall, New Jersey, pp. 365-444.

Courrieu, P., "Fast computation of Moore-Penrose inverse matrices", Neural Information Processing Letters and Reviews, vol. 8, No. 2, Aug. 2005, pp. 25-29.

Ekstrom, M.P., "A Spectral Characterization of the Ill-conditioning in Numerical Deconvolution," IEEE Transactions on Audio and Electroacoustics, vol. 21, No. 4, Aug. 1973, pp. 344,348.

* cited by examiner

US 9,966,983 B2

INTERFERENCE CANCELLATION IN MIMO SAME CHANNEL FULL-DUPLEX TRANSCEIVERS

TECHNICAL FIELD

The present invention relates generally to managing the allocation of resources in a network, and in particular embodiments, to techniques and mechanisms for interference cancellation in MIMO same-channel full-duplex transceivers.

BACKGROUND

The recent proliferation of wireless telecommunications has caused spectrum bandwidth to become increasingly valuable. Accordingly, wireless service providers are constantly searching for new techniques for increasing spectral efficiency. One proposed technique is known as same-channel full-duplex communication, where transmission and reception signals are communicated over common network resources, and the received signals are processed using interference-cancellation techniques. As an example, a cellular network adapted for same-channel full-duplex communication would communicate uplink and downlink signals over the same time-domain, frequency-domain, and coding-domain resources, and the base station would use knowledge of the downlink baseband signal to remove interference from the received uplink radio signal, while the mobile station would use knowledge of the uplink baseband signal to remove interference from the downlink radio signal. The primary challenge in same channel full-duplex communications is that interference components attributable to local transmitting antennas are typically orders of magnitude stronger than the received signal component. In practice, the presence of such strong interference components in the received radio signal can significantly increase bit-error rates and generally degrade the quality (and spectral efficiency) of the wireless link. Accordingly, techniques for improving wireless link performance in same channel full-duplex networks are desired.

SUMMARY OF THE INVENTION

Technical advantages are generally achieved, by embodiments of this disclosure which describe interference cancellation in MIMO same channel full-duplex transceivers.

In accordance with an embodiment, a method for receiving data in a multiple-input multiple-output (MIMO) full-duplex communication channel is provided. In this example, the method includes receiving a radio signal over a first antenna of a multi-antenna array. The radio signal includes a received signal component corresponding to a communications signal being received over the MIMO full-duplex communication channel. The method further includes obtaining baseband samples of transmission signals communicated over the MIMO full-duplex communication channel. The transmission signals include at least a first transmission signal emitted over the first antenna and a second transmission signal emitted over a second antenna of the multi-antenna array. The method further includes performing channel estimation for the radio signal in accordance with the baseband samples to generate an interference-cancellation signal. The interference-cancellation signal includes at least a first interference component corresponding to the first transmission signal and a second interference component corresponding to the second transmission signal. The method further includes subtracting the interference cancellation signal from the radio signal to at least partially isolate the received signal component from interference in the radio signal. An apparatus for performing this method is also provided.

In accordance with another embodiment, a communications device adapted for communicating via a multiple-input multiple-output (MIMO) full-duplex communication channel is provided. In this example, the communications device comprises a multi-antenna array comprising at least a first antenna and a second antenna, one or more transmission modules coupled to the multi-antenna array, and a signal processing module coupled to the first antenna. The first antenna is configured to receive a radio signal that includes a received signal component corresponding to a communications signal communicated over the MIMO full-duplex communication channel. The one or more transmission modules are configured to perform a transmission over the MIMO full-duplex communication channel by emitting at least a first transmission signal over the first antenna and a second transmission signal over the second antenna. The signal processing module is configured to obtain at least a first baseband sample of the first transmission signal and a second baseband sample of the second transmission signal, and to perform interference cancellation on the radio signal using both the first baseband sample and the second baseband sample to at least partially isolate the received signal component from interference in the radio signal.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure adapt same-channel full-duplex communications to support multiple-input multiple-output (MIMO) processing in order to derive increased signal performance (e.g., spectral efficiency, link reliability, etc.) through the exploitation of spatial diversity. More specifically, aspects of this disclosure provide signal processing techniques that allow strong interference components from multiple local antennas to be removed from a received radio signal, which allows the array and diversity gain benefits of MIMO to be enjoyed in the same-channel full-duplex communications. In one embodiment, baseband samples of two or more MIMO transmission signals are used by a receiver to perform channel estimation on a received radio signal. The baseband signals may be correlated with the radio signal to estimate interference channels associated with the MIMO transmission signals, and the estimated interference channels may be used to subtract corresponding interference components from the received radio signals. These and other aspects are disclosed in greater detail below.

Figure 1:
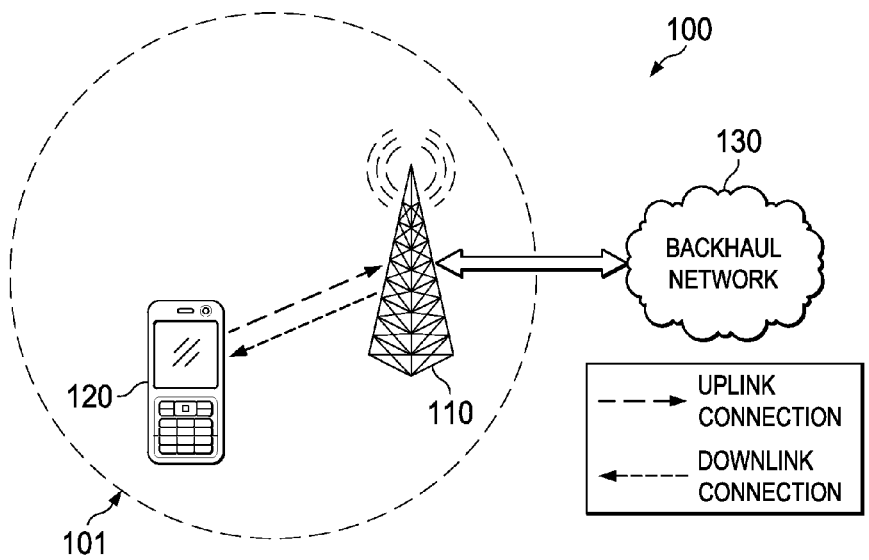
FIG. 1 illustrates a diagram of an embodiment wireless communications network.

FIG. 1 illustrates a network 100 for communicating data. The network 100 comprises an access point (AP) 110 having a coverage area 101, a plurality of mobile stations 120, and a backhaul network 130. The AP 110 may comprise any component capable of providing wireless access by, inter alia, establishing uplink (dashed line) and/or downlink (dotted line) connections with the mobile stations 120, such as a base station, an enhanced base station (eNB), a femtocell, and other wirelessly enabled devices. The mobile stations 120 may comprise any component capable of establishing a wireless connection with the AP 110, such as a user equipment (UE), a station (STA), or other mobile devices. Those skilled in the art will appreciate that the term mobile device should be considered to include devices that can access so-called mobile wireless networks, even if the device is intended for use in a fixed location such a machine-to-machine device (e.g. a water or electricity meter that is not itself mobile, but makes use of a mobile wireless network for its connectivity). The backhaul network 130 may be any component or collection of components that allow data to be exchanged between the AP 110 and a remote end (not shown). In some embodiments, the network 100 may comprise various other wireless devices, such as relays, low power nodes, etc.

Figure 2:
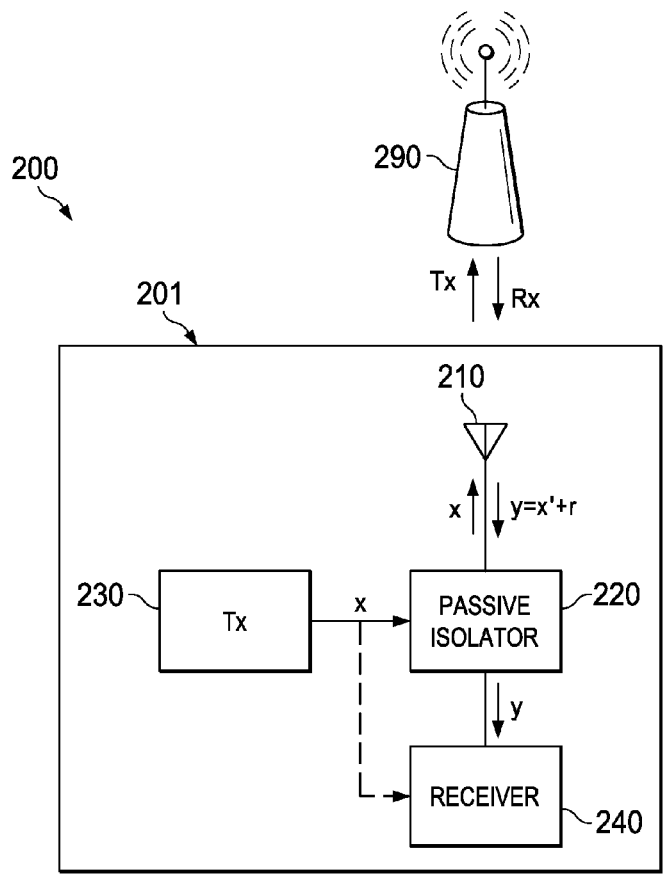
FIG. 2 illustrates a diagram of a conventional same-channel full-duplex communications system.

Conventional transceivers typically perform same-channel full-duplex transmissions over a single antenna, and therefore do not benefit from spatial diversity of MIMO communication. These conventional transceivers may perform the single antenna transmission over the same antenna used to receive the communications signal communicated to the transceiver, or over a different antenna. FIG. 2 illustrates a conventional same-channel full-duplex communications system 200 in which a device 201 transmits and receives signals to/from a device 290 over a single antenna 210. As shown, the device 201 includes an antenna 210, a passive isolator 220, a transmitter 230, and a receiver 240. The transmitter 230 may be configured to generate a baseband signal (x), which is propagated through the passive isolator 220 and emitted over the antenna 210 as a transmission signal (Tx). Additionally, a radio signal (y) may be detected by the antenna 210, and may propagate through the passive isolator 220 to the receiver 240. The radio signal (y) may include a signal component (r) corresponding to a wireless communications signal (Rx) being communicated from the device 290 to the device 201, as well as a strong interference component (x') attributable to the transmission signal (Tx). The strong interference component (x') may include multiple reflections associated with the transmission signal (Tx). For example, the strong interference component (x') may include a reflected portion of the baseband transmission signal (x) that is redirected backwards off the antenna 210 during emission of the transmission signal (Tx). The strong interference component (x') may also include reflected portions of the transmission signal (Tx) that bounce off objects (e.g., buildings, etc.). The receiver 240 may be configured to perform interference cancellation on the radio signal (y) in accordance with a sample of the baseband signal (x) to remove interference from the radio signal (y).

Figure 3:
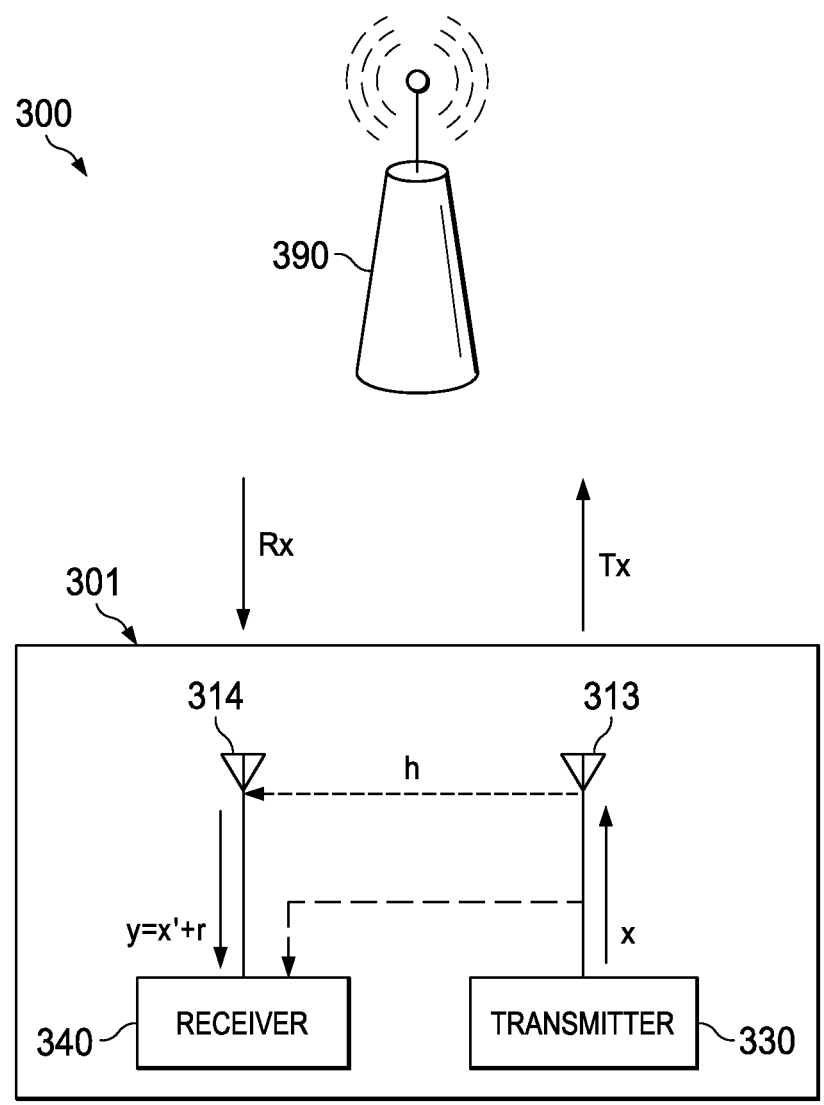
FIG. 3 illustrates a diagram of another conventional same-channel full-duplex communications system.

FIG. 3 illustrates a conventional same channel full-duplex communications system 300 in which a device 301 receives signals from a device 390 over an antenna 314, and transmits signals to the device 390 over an antenna 313. As shown, the device 301 includes the antennas 313, 314, a transmitter 330, and a receiver 340. The transmitter 330 is configured to generate a baseband signal (x), which is emitted over the antenna 313 as a transmission signal (Tx). Additionally, a radio signal (y) detected over the antenna 314 propagates to the receiver 340. The radio signal (y) includes a signal component (r) corresponding to a wireless communications signal (Rx) being communicated from the device 390 to the device 301, as well as a strong interference component (x') attributable to the transmission signal (Tx). In this example, the strong interference component (x') may include a main component that propagates over an interference channel (h) when the transmission signal (Tx) is emitted over the antenna 313. The receiver 340 may be configured to perform interference cancellation on the radio signal (y) in accordance with a sample of the baseband signal (x) to remove interference from the radio signal (y).

Figure 4:
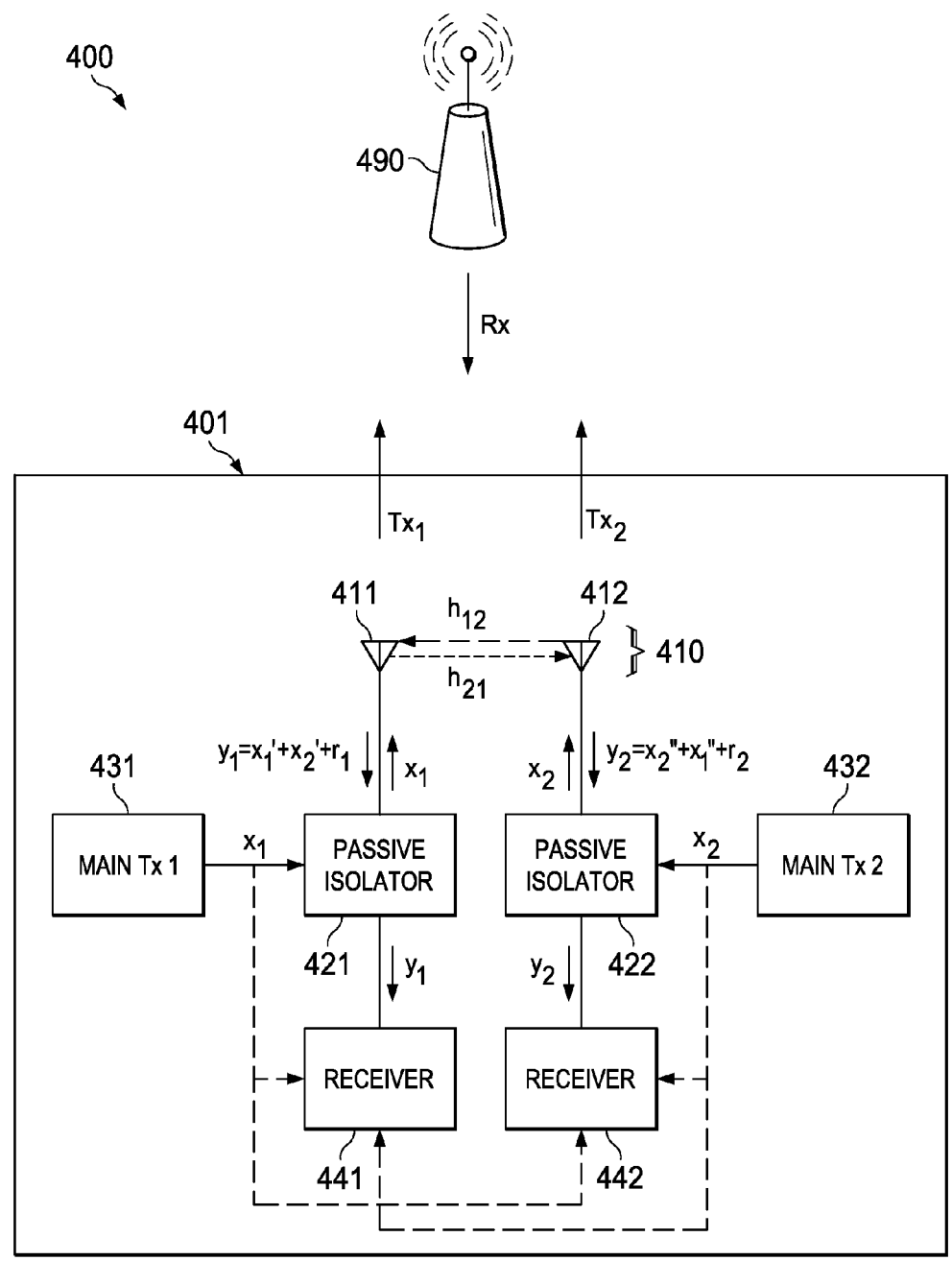
FIG. 4 illustrates a diagram of an embodiment MIMO same-channel full-duplex communications system.

Aspects of this disclosure leverage MIMO in same-channel full-duplex communication systems techniques to attain increased spectral efficiency and link reliability performance. FIG. 4 illustrates an embodiment MIMO same channel full-duplex communications system 400 in which a device 401 transmits and receives MIMO communication signals to/from a device 490 over a multi-antenna array 410. As shown, the device 401 includes a multi-antenna array 410 including antennas 411, 412, passive isolators 421, 422, transmitters 431, 432, and receivers 441, 442. The transmitter 431 is configured to generate a baseband signal ($x_1$), which propagates through the passive isolator 421 prior to being emitted over the antenna 411 as transmission signal ($Tx_1$). The transmitter 432 is configured to generate a baseband signal ($x_2$), which propagates through the passive isolator 422 prior to being emitted over the antenna 412 as transmission signal ($Tx_2$). Together, the transmission signals $Tx_1$, $Tx_2$ form the MIMO communication signal communicated from the device 401 to the device 490.

Further, a radio signal ($y_1$) is detected by the antenna 411 and propagates through the passive isolator 421 to the receiver 441, and a radio signal ($y_2$) is detected by the antenna 412 and propagates through the passive isolator 422 to the receiver 442.

The radio signal ($y_1$) includes a signal component ($r_1$) corresponding to a wireless communications signal (Rx) being communicated from the device 490 to the device 401, as well as a first strong interference component ($x_1'$) attributable to the transmission signal ($Tx_1$) and a second strong interference component ($x_2'$) attributable to the transmission signal ($Tx_2$). The strong interference component ($x_1'$) may include a main reflection component that propagates over an interference channel ($h_{11}$) when the transmission signal ($Tx_1$) is emitted over the antenna 411, while the strong interference component ($x_2'$) may include a main component that propagates over an interference channel ($h_{12}$) when the transmission signal ($Tx_2$) is emitted over the antenna 412. The interference channel ($h_{11}$) may correspond to a reflection coefficient parameter of the antenna 411, and is not depicted in the embodiment same channel full-duplex communications system 400 for purposes of clarity and concision.

The radio signal ($y_2$) includes a signal component ($r_2$) corresponding to the wireless communications signal (Rx) being communicated from the device 490 to the device 401, as well as a first strong interference component ($x_1''$) attributable to the transmission signal ($Tx_1$) and a second strong interference component ($x_2''$) attributable to the transmission signal ($Tx_2$). The strong interference component ($x_1''$) may include a main reflection component that propagates over an interference channel ($h_{21}$) when the transmission signal ($Tx_1$) is emitted over the antenna 411, while the strong interference component ($x_2''$) may include a main reflection component that propagates over an interference channel ($h_{22}$) when the transmission signal ($Tx_2$) is emitted over the antenna 412. The interference channel ($h_{22}$) may correspond to a reflection coefficient parameter of the antenna 412, and is not depicted in the embodiment same channel full-duplex communications system 400 for purposes of clarity and concision. Notably, the wireless communications signal (Rx) may be a MIMO communications signal that is communicated over a multi-antenna array of the device 490.

The receivers 441, 442 are configured to process the radio signals $y_1$, $y_2$ upon reception. The receiver 441 may perform interference cancellation on the radio signal $y_1$ using samples of the baseband signals $x_1$, $x_2$ to at least partially isolate the signal component $r_1$ from the interference components $x_1'$, $x_2'$. In doing so, the receiver 441 may: (i) perform channel estimation to estimate the interference channels $h_{11}$ and $h_{12}$; (ii) interpolate an interference cancellation signal ($\hat{y}_1$) from the estimated interference channels $h_{11}$ and $h_{12}$, and (iii) subtract the interference cancellation signal ($\hat{y}_1$) from the received radio signal (y) to obtain a less distorted version of the received signal component ($r_1$). In one embodiment, the receiver 441 compares the samples of the baseband signals $x_1$, $x_2$ with the radio signal $y_1$ to obtain estimates of the interference channels $h_{11}$, $h_{12}$, by means of a least squares approximation. The estimated interference channels $h_{11}$, $h_{12}$ are then used to filter the baseband signals $x_1$, $x_2$ to obtain the interference cancellation signal ($\hat{y}_1$). Likewise, the receiver 442 may perform interference cancellation on the radio signal $y_2$ in a similar manner to at least partially isolate the signal component $r_2$ from the interference components $x_1''$, $x_2''$.

Figure 5:
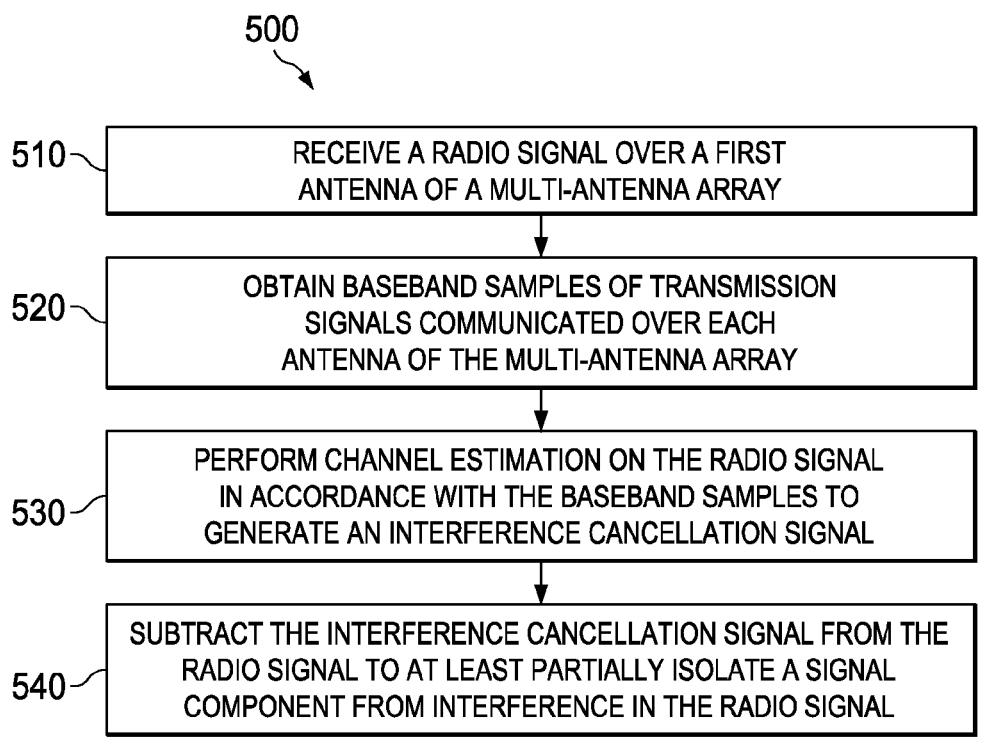
FIG. 5 illustrates a flowchart of an embodiment method for processing a radio signal communicated over a MIMO same channel full-duplex communications channel.

FIG. 5 illustrates an embodiment method 500 for processing a radio signal communicated over a MIMO same channel full-duplex communications channel. As shown, the method 500 begins with step 510, where a mobile device receives a radio signal over a first antenna of a multi-antenna array. The radio signal includes a signal component of a communications signal that is communicated to the device. Next, the method 500 proceeds to step 520, where the mobile device obtains baseband samples of transmission signals emitted over each antenna of the multi-antenna array. The transmission signals collectively form a MIMO transmission signal that is communicated over the same resources as the communications signal. Subsequently, the method 500 proceeds to step 530, where the device performs channel estimation on the radio signal in accordance with the baseband samples and received interference samples, to generate an interference cancellation signal. Thereafter, the method 500 proceeds to step 540, where the device subtracts the interference cancellation signal from the radio signal to at least partially isolate the signal component from interference in the radio signal.

Figure 6:
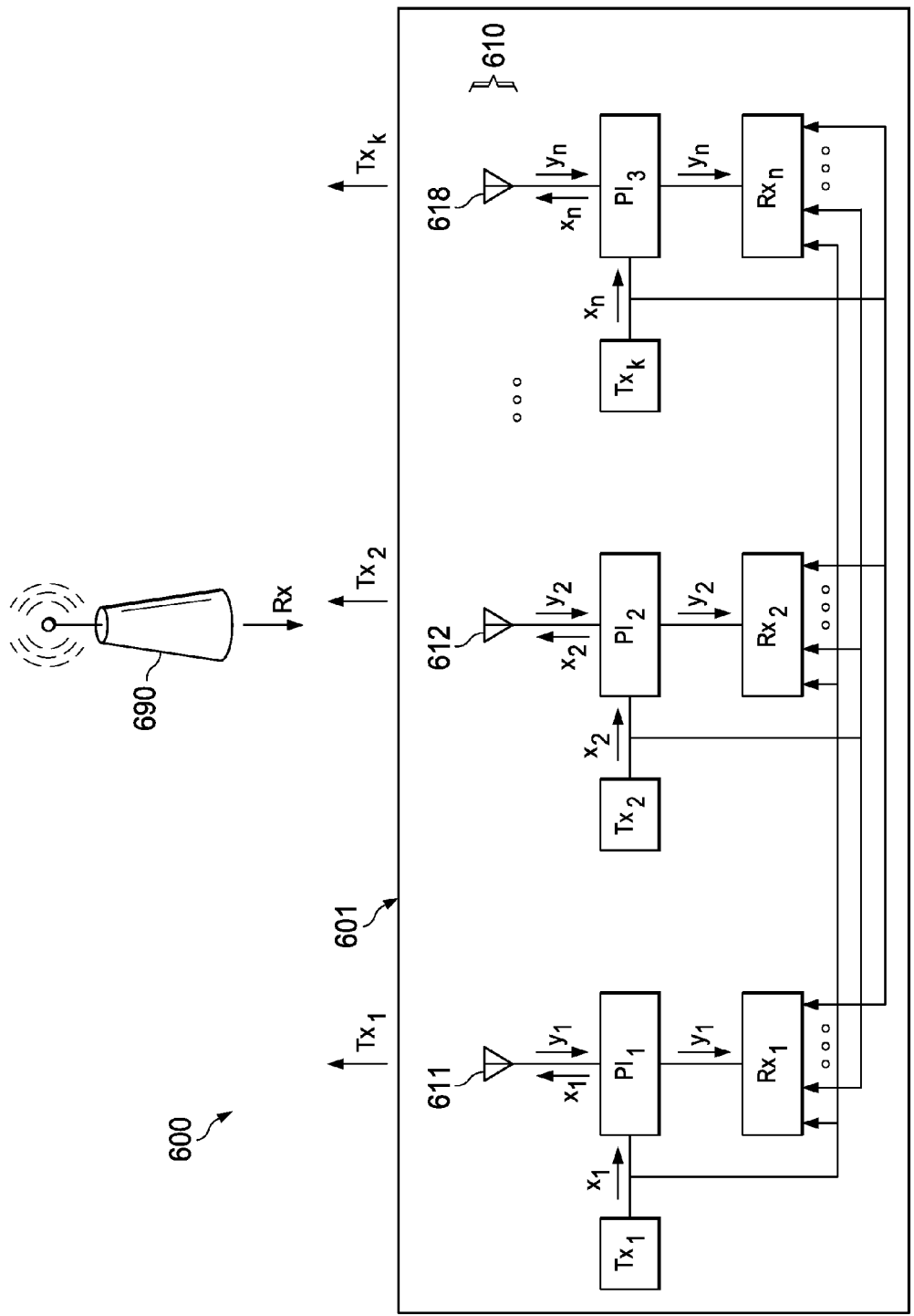
FIG. 6 illustrates a diagram of another embodiment MIMO same-channel full-duplex communications system.

Aspects of this disclosure can support same channel full-duplex MIMO communications over any number of antennas. FIG. 6 illustrates an embodiment MIMO same channel full-duplex communications system 600 in which a device 601 transmits and receives communication signals to/from a device 690 over a multi-antenna array 610 that includes K antennas 611, 612, ... 618 (where K is an integer greater than two). The device 601 may remove interference from the received radio signals ($y_1, y_1, \ldots, y_K$)

In same-channel full-duplex communications, the simultaneous transmission and reception of signals over a single antenna or proximately located antennas causes the received radio signal to experience a strong interference component attributable to the transmission signal, which is referred to herein as self-interference when the signals are communicated over the same antenna (e.g., FIG. 2) and mutual-interference when the signals are communicated over proximately located antennas (e.g., FIG. 3).

Aspects of this disclosure demonstrate same-channel full-duplex MIMO transmission. During practical implementation, there may be several stages of interference cancellation, e.g., passive analog cancellation, active analog cancellation, and digital cancellation. Aspects of this disclosure utilize active analog cancellation and digital cancellation without placing any requirements on the initial passive-cancellation stage, except that some implementations may sample the self-interference signal via an analog-to-digital converter with minimal distortion. However, the ultimate performance both in terms of overall rejection and SNR of the desired UE signal may substantially depend on the initial passive-cancellation stage.

For same-channel full-duplex MIMO to be viable, it may be necessary to obtain near-optimal interference detection in order to approach target performance levels. For example, depending upon the rejection achieved by the passive cancellation, the latter two stages may be required to provide an additional 60 decibel's (dBs) or more in order to provide a useful SNR on the UE signal. To provide 60 dBs of rejection may require that the self-interference is estimated to an accuracy of 0.005 dBs (or better). For comparison purposes, the best modern-day test equipment typically provide an absolute accuracy of 0.5 dB and a differential accuracy of 0.1-0.2 dB. If the self-interference channel is dynamic (e.g., fading), the problem becomes even more challenging.

Least-squares estimation can provide good rejection, and with an appropriate implementation strategy can be used in a real-time high-bandwidth communications system. The Least-squares estimation techniques disclosed herein can be applied to a generic communications system as they apply to the time-domain signal and do not assume any signal structure. In addition, they can be applied to any signal bandwidth subject to the availability of sufficient processing power. Indeed, aspects of this disclosure show how the least squares estimation can be advantageously applied to an OFDM signal structure.

In this disclosure, the term detector may refer to any mechanism for estimating and/or cancelling interference. In some embodiments, detectors may correspond to high-performance receivers. In some embodiments, the self-interference occurs at the base station, and the communications signal being demodulated is transmitted by a UE or mobile station. In other embodiments, the self-interference occurs at the UE, and the communications signal being demodulated is transmitted by the base stations.

Figure 7:
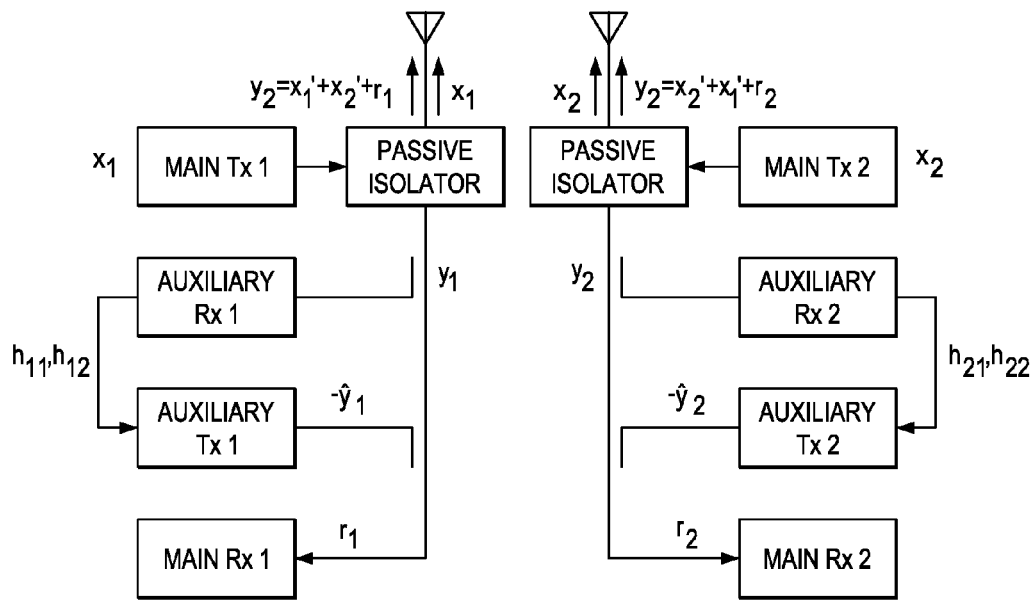
FIG. 7 illustrates a diagram of an embodiment MIMO same-channel full-duplex detector.

FIG. 7 illustrates an embodiment structure for a detector where each module includes a main transmitter and receiver connected by a three-port passive isolation device. More sophisticated devices may include active components that perform signal processing in the digital domain. Between the main transmitter and receiver is an auxiliary receiver and transmitter that are coupled into the main signal path. The auxiliary path may sample the signal, estimate the self-interference and remove it before it reaches the main receiver. In some embodiments, a second-stage of active analog cancellation may be performed to reduce the self-interference to a level where it neither saturates the main receiver nor reduces the resolution on the desired signal.

In a single transmitter/receiver, although the baseband transmit signal is assumed known, this usually is not equivalent to the self-interference signal. In particular, the self-interference signal may be distorted by various factors/considerations, such as by digital and analog filters in the Main transmit chain, by nonlinearities in the main transmit chain, and by multiple reflections/versions of the baseband signal. The reflections may arise from impedance mismatches at the ports of the passive cancellation device and/or the antenna, and from multipath reflections from the local environment of the antenna. In some embodiments, the baseband transmit signal may pass through a frequency-selective channel before causing the self-interference. Without loss of generality, the following analysis may occur in the complex baseband, and it may be assumed that all transmit/receive pairs share a common clock. In addition to self-interference, when K>1, there will be mutual interference between the different transmitters. This mutual interference will undergo qualitatively similar (but quantitatively different) distortions to that affecting the self-interference signal. This mutual interference may be due to coupling/transmissions between the antennas or due to reflections of the transmission of one antenna returning to the second antenna.

For a two antenna case (e.g., K=2) in which it is assumed that all distortions are linear, the interference signal ($y_1(t)$) at a first transmitter is represented as follows: $y_1(t)=h_{11}(t)*x_1(t)+h_{12}(t)*x_2(t)$, where $x_1(t)$ represents the undistorted baseband signal from the first transmitter, $x_2(t)$ represents the undistorted baseband signal from the second transmitter, $h_{11}(t)$ is the impulse response of the channel between the transmit #1 and receive #1 baseband; and $h_{21}(t)$ is the impulse response of the channel between transmitter #2 and receiver #1. The * represents linear convolution in the above equation. For clarity, the signal component (and associated noise) are excluded from the equations as those components are expected to be negligible (or small relative to the interference components) at this stage of cancellation. Let $\hat{y}_1(t)$ represent an estimate of the interference. For reference, the average rejection of the transmitted signal may be defined as the ratio of error in the estimate to the interference power, which can be expressed as follows:

$$R_{dB} = -10\log_{10}\left[\frac{E|y_1(t) - \hat{y}_1(t)|^2}{E|y_1(t)|^2}\right]$$

In some embodiments, the objective is to make the rejection as large as possible, or at least to make the residual interference smaller than the signal component. For a K=2 system, the interference components can be expressed as:

$$\begin{bmatrix} y_1(t) \\ y_2(t) \end{bmatrix} = \begin{bmatrix} h_{11}(t) & h_{12}(t) \\ h_{21}(t) & h_{22}(t) \end{bmatrix} * \begin{bmatrix} x_1(t) \\ x_2(t) \end{bmatrix}.$$

In some embodiments, channel estimations for same-channel full-duplex MIMO communications may utilize a least-squares algorithm. One objective may be to estimate the impulse responses $h_{ij}(t)$ described in the previous section. In practice, it is possible to work with sampled signals as opposed to continuous signals. Let $x_i(k)$, $k=1, \ldots, N$ represent a block of baseband signal samples for transmitter i, and let $y_i(k)$, $k=1, \ldots, N$ represent the corresponding interference samples. The channel impulse response between detector i and transmitter j is represented by $h_{ij}(k)$, $k=1, \ldots, M$. The data matrix for the sequence $\{x_i(k)\}$ can be expressed as follows:

$$X_i = \begin{bmatrix} x_i(k) & x_i(k-1) & \ldots & x_i(k-M+2) & x_i(k-M+1) \\ x_i(k+1) & x_i(k) & x_i(k-1) & \ldots & x_i(k-M) \\ x_i(k+2) & x_i(k+1) & x_i(k) & \ldots & x_i(k-M-1) \\ \vdots & \vdots & \vdots & \vdots & \vdots \\ \vdots & \vdots & \vdots & \vdots & \vdots \\ x_i(k+N-2) & x_i(k+N-3) & \ldots & x_i(k+N-M) & x_i(k+N-M-1) \\ x_i(k+N-1) & x_i(k+N-2) & x_i(k+N-3) & \ldots & x_i(k+N-M) \end{bmatrix}$$

The above matrix may be a N×M Toeplitz matix with the samples of the $i^{th}$ transmit baseband signal on the sub-diagonals. The data matrix may allow the discrete convolution equivalent of the signal interference equation to be expressed as follows:

$$y_1 = X_1 h_{11} + X_2 h_{12} = [X_1 \ X_2]\begin{bmatrix} h_{11} \\ h_{12} \end{bmatrix},$$

where $y_i \in C^{N \times 1}$, $X_i \in C^{N \times M}$, $h_{ij} \in C^{M \times 1}$ are vectors or matrices of discrete complex baseband samples. Further, N is the block size upon which the estimate is to be based, and M is the length of the impulse response. N and M may be determined by physical considerations. This equation can be expressed generally as $y=Xh$, where $y=y_1$ and $X=[X_1 \ X_2]$ are known. Since typically N>M, this is an over-determined linear system, where it is desirable to determine $h=[h_{11} \ h_{12}]^T$ and X is a non-square matrix. One solution to this problem is to use the Moore-Penrose (pseudo) inverse as described by the paper "Fast Computation of Moore-Penrose Inverse Matrices," Neural Information Processing Letters and Reviews, Vol. 8, No. 2, August 2005, pp. 25-29., which is incorporated herein by reference as if reproduced in its entirety. A least squares solution maybe expressed as $h=(XX^H)^{-1}X^Hy$. The least squares solution may substantially reduce/minimize the square error between $$\sum_k |y(k) - h * x(k)|^2,$$

and is discussed in *Adaptive Filter Theory*, Chapter 9, 3$^{nd}$ ed., Prentice-Hall, New Jersey, 1991, which is incorporated by reference herein as if reproduced in its entirety. While some portions of the disclosure may use the symbol N to refer to antennas and baseband symbols, it is possible that the number of baseband signals/samples may differ from the number of antennas. In those occasions, the symbol K should be used to represent the number of antennas, and the symbol N should be used to represent the number of baseband signals/samples.

It is possible to use the above equation to calculate the Moore-Penrose (pseudo) inverse. However, in this application, the data matrix may be ill-conditioned, and consequently an alternative technique may be to perform a singular-value decomposition (SVD) of X, and discard the insignificant singular values. The data matrix may be ill-conditioned data matrix if the baseband signal does not occupy the full Nyquist bandwidth as discussed in "A spectral characterization of the ill-conditioning in numerical deconvolution," *IEEE Trans. Audio and Electroacoustics*, Vol. 21, No. 4, August 1973, pp. 344-348, which is incorporated by reference herein as if reproduced in its entirety.

Computing the pseudo-inverse without using SVD to improve the conditioning may produce a result that is both highly specific to the given data set and very sensitive to implementation errors. If one uses the computed impulse response with the same channel but a different data set, the accuracy of the interference estimate can be significantly degraded.

In an embodiment, the Moore-Penrose pseudo-inverse may be represented by the matrix $A^+=(XX^H)^{-1}X^H$, and the same algorithm may apply for any number inputs.

In practice, noise in the signal component may limit the accuracy of the least-squares estimator. In the general case, consider the equation: $y=Xh+n$, where h is M×1 vector representing the channel impulse response, n is an N×1 vector representing effective noise; and X is the N×M data matrix of known transmitted signal samples. In this application, the effective noise is primarily contained in the signal component. As described above, the minimum square error (MSE) solution for the channel estimate h is given as follows:

$$\hat{h} = (X^H X)^{-1} X^H y$$
$$= h + (X^H X)^{-1} X^H n$$

If the ill-conditioned aspects of the pseudo inverse are ignored, it is assumed that n is a zero mean, and $v=\hat{h}-h=(X^HX)^{-1}X^Hn$, then the covariance of the impulse response estimate can be expressed as follows:

$$E[vv^H] = E[(X^H X)^{-1} X^H n n^H X (X^H X)^{-H}]$$
$$= (X^H X)^{-1} X^H E[nn^H] X (X^H X)^{-1}$$
$$= \sigma^2 (X^H X)^{-1},$$

where it is assumed that n is independent and approximately white (e.g., $E[nn^H]=\sigma_{UE}^2 I$), $\sigma_{UE}^2$ is the average signal component power. Furthermore, if it is assumed that the input is zero mean and relatively white then $E[XX^H] \approx N\sigma_X^2 I$, where $\sigma_X^2$ the average transmit power, and $$E[vv^H] = \frac{\sigma_{UE}^2}{N \sigma_x^2} I.$$

Note, since the data matrix X is ill-conditioned, there may be some significant variations from the above equations in practice, but the equation may still be useful as for approximation.

In this example, the noise of the channel estimates may be proportional to the signal component power and inversely proportional to the block size over which the estimate is made. Increasing the block size may allow for more accurate interference estimation. A limitation to this improvement in accuracy may be how quickly the channel is varying in time (e.g., how fast the channel is fading). The error on the estimated interference $\hat{y}_i(k)$ can be expressed as follows:

$$\hat{y} - y = X(h+v) - Xh$$
$$= Xv$$

When the square error inherent in the least squares estimator is considered, the error on the estimated interference can be expressed as follows:

$$E[(\hat{y} - y)(\hat{y} - y)^H] = E[Xvv^H X^H]$$
$$= \frac{\sigma_{UE}^2}{N\sigma_x^2} E[XX^H]$$
$$\frac{M\sigma_{UE}^2}{N} I$$

This formulation may assume that that the baseband signal is zero mean and relatively white. In fact, the last line of the equation follows from the previous due to the properties of the pseudo-inverse and does not require the assumption of a relatively white baseband signal.

The ratio of block size N to the number of parameters to be estimated M may be referred to as the processing gain, PG=N/M. From the estimated interference equation given above, the expected rejection ratio due to least squares estimation can be calculated as follows:

$$\text{Rejection} = \frac{E[(\hat{y}_i - y_i)(\hat{y}_i - y_i)^H]}{E[y_i y_i^H]}$$
$$= \frac{M}{N} \frac{\sigma_{UE}^2}{\sigma_y^2}.$$

So the expected rejection may be the ratio of the signal component power to self-interference power improved by the processing gain, assuming some unconsidered physical constraint does not limit rejection from achieving this value. If it is assumed that there is no Gaussian noise in the system, then the ratio of the signal component power ($\sigma^2$) to the residual interference power (e.g., the variance of $\hat{y}(k)-y(k)$) can be expressed as follows:

$$SNR_{UE} = \frac{\sigma_{UE}^2}{\left(\frac{M\sigma_{UE}^2}{N}\right)} = \frac{N}{M} = PG$$

Thus, the SNR on the signal component is proportional to the block size of the estimator and inversely proportional to the number of parameters that are to be estimated. Thus, for a constant block size, if one goes from a single-input SISO system to a "2×2 MIMO" system, which has double the number of parameters, one can expect a 3-dB decrease in the UE SNR; and a further 3-dB decrease with a 4×4 system.

Much of the preceding analysis assumes that the channel is constant, and consequently that performance can be improved through averaging over longer time periods. Portions of the below analysis consider the effects of a time-varying channel, e.g., fading, on channel estimation. A simplified complex-baseband discrete-time model can be expressed as $\hat{d}(k)=\hat{h}^H x_k + n$, where X is the complex-baseband data matrix, h is the channel estimate, n is the additive noise, and d is the estimate of self-interference at time k. In a 2×2 MIMO scenario, $u=[u_1 \ u_2]^T$ and $w=[h_{11} \ h_{12}]^T$. The actual self-interference may be represented as follows: $d(k) = h^H x_k + \Delta h^H x_k$. If noise is ignored, the error in the self-interference estimate due to channel variations can be expressed as: $E[(d(k)-\hat{d}(k))(d(k)-\hat{d}(k))^H] = E[(\Delta h^H x_k)(\Delta h^H x_k)^H]$, where $\Delta h$ is the variation of the channel over the observation period. If it is assumed that the input is approximately white so that $E[x_k x_k^H] = \sigma_x^2 I$, then it is possible to express the error as follows:

$$E\left[(d(k)-\hat{d}(k))(d(k)-\hat{d}(k))^H\right] = \sigma_x^2 E[\Delta h^H I \Delta h]$$
$$= \sigma_x^2 \sum_k \sigma_h^2(k)$$

This makes the reasonable assumption that the fading is independent of the signal, and $\sigma_h^2(k)$ is the variance of the $k^{th}$ contributor to the multipath channel. It may be assumed that all multipath contributors to the channel are independent and identically distributed. Note that $\sigma_h^2(k)$ is the variance of the $k^{th}$ path over the observation interval. Consider a generic fading process f(t) that is a complex Gaussian distributed with known spectra $H_f(f)$. We sample f(t) on the interval [0,T] and the variance of f(t) over this interval can be define using the following equation:

$$\text{var}(f) = \frac{1}{T}\int_0^T |f(t) - \bar{f}|^2 dt.$$

The average over the observation window [0,T] is defined as $$\bar{f} = \frac{1}{T}\int_0^T f(t) dt.$$

To estimate this variance over the observation window, it is assumed that the observation window is short relative to the de-correlation time of the fading process. Then, it is possible to use the first order approximation on the interval [0,T], which is expressed as $$f(t) \approx f(T/2) + \frac{df}{dt}\bigg|_{t=T/2}(t - T/2).$$

With this approximation, $\bar{f}=f(T/2)$ and the variance is expressed as follows:

$$\text{Var}(f) = E\left[\frac{1}{T}\int_0^T \left|\frac{df}{dt}(t-T/2)\right|^2 dt\right]$$
$$= E\left[\left|\frac{df}{dt}\right|^2\right]\frac{1}{T}\int_0^T (t-T/2)^2 dt$$
$$= \frac{T^2}{12} E\left[\left|\frac{df}{dt}\right|^2\right]$$

To continue evaluating this, it may be assumed that the process is ergodic, and then Parseval's theorem may be applied as follows:

$$E\left[\left|\frac{df}{dt}\right|^2\right] = \lim_{T\to\infty}\frac{1}{T}\int_0^T \left|\frac{df}{dt}\right|^2 dt$$
$$= \int_{-\infty}^{\infty} |(j2\pi f)H_f(f)|^2 df,$$

where $H_f(f)$ is the amplitude spectrum of the fading process.

To evaluate this equation, two cases for the fading spectrum $H_f(f)$ are considered. In the first case, it is assumed that $H_f(f)$ has a rectangular spectrum with one-sided bandwidth $f_B$. As such, performing the above integration in combination with the above equation allows variance to be expressed as follows:

$$\text{Var}(f) = \frac{(\pi f_B T)^2}{16}.$$

Alternatively, if we use the classic Clarke spectrum, then the fading spectrum is expressed as follows:

$$H_f(f) = \frac{1}{\pi\sqrt{f_D^2 - f^2}} \text{ for } f < f_D.$$

Then the following result is obtained:

$$\text{Var}(f) = \frac{(\pi f_D T)^2}{12}.$$

The above expressions for variance and error may be valid for small values of T, but may show a square dependence on the product $\pi f_B T$, where $f_B$ is the one-sided bandwidth of the fading spectrum. Even for small T, the degradation due to fading will grow quickly as T increases. If we combine the channel estimation errors due to the signal component noise and the fading variations, the following expression for the signal component SNR (assuming a Clarke spectrum) is obtained:

$$SNR_{UE} = \frac{\sigma_{UE}^2}{\frac{M}{N}\sigma_{UE}^2 + \sigma_X^2 \frac{(\pi f_D T)^2}{12}}.$$

This assumes that the average power over all M fading components is one. If $T_s$ represent the sample rate (so $T=NT_s$) and $\gamma = \sigma_X^2/\sigma_{UE}^2$ represents the input SNR (self-interference to UE power ratio after the passive-cancellation stage), then it is possible to obtain the following simplified expression:

$$SNR_{UE} = \frac{1}{\frac{M}{N} + N^2\gamma \frac{(\pi f_D T_s)^2}{12}}.$$

This expression shows the dependence of the component signal SNR as a function of the length of the observation window N. As the observation window N increases, the contribution due to the component signal noise decreases, but the contribution due to fading increases, implying that there is an optimum N.

Figure 8:
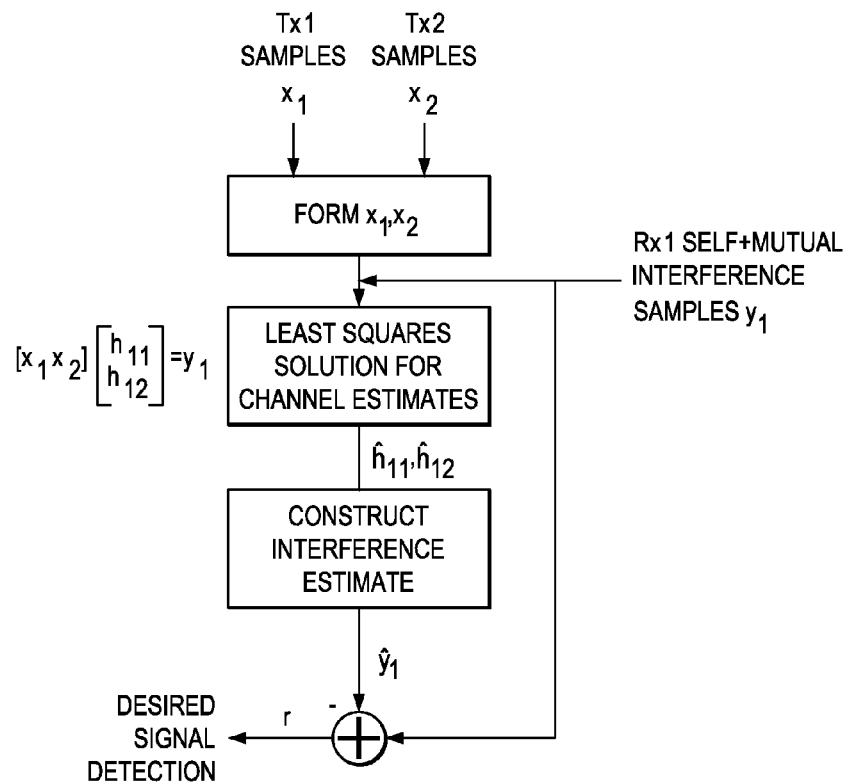
FIG. 8 illustrates a diagram of an embodiment signal flow in a MIMO interference cancellation algorithm.

FIG. 8 illustrates an embodiment signal flow for a MIMO interference cancellation algorithm in a two antenna MIMO transceiver. The self-interference is estimated and subtracted in the second receiver in an analogous manner. This signal flow can be extended to K antenna receivers, with the dimension of the system increasing by a factor of K.

Figure 9:
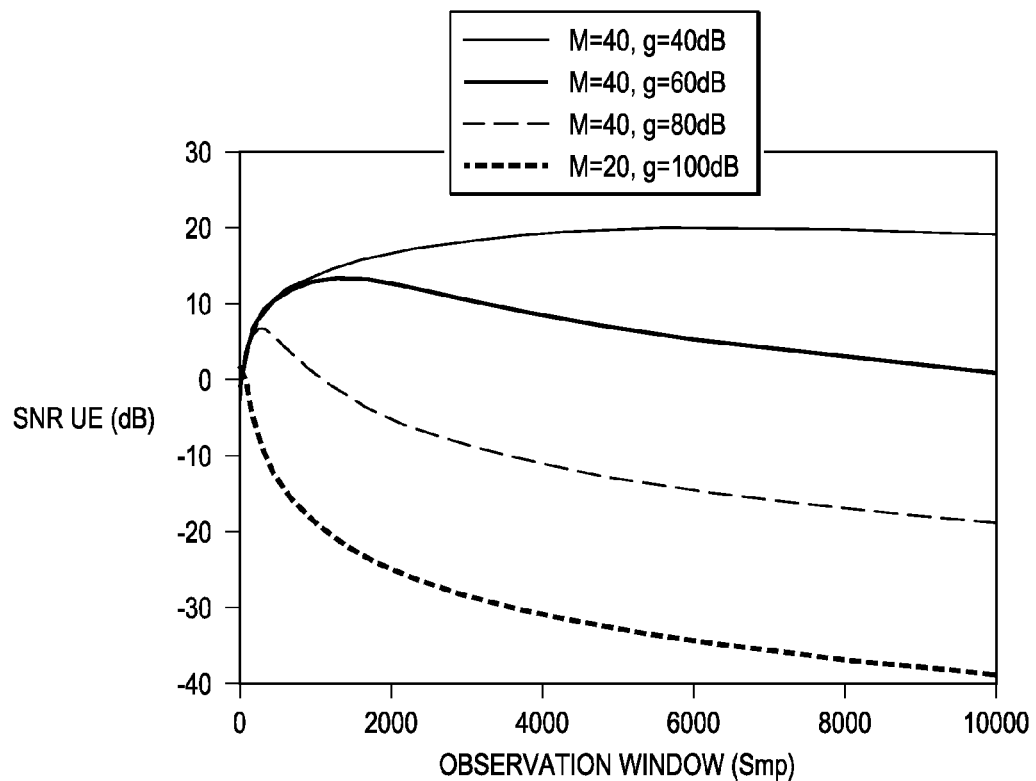
FIG. 9 illustrates a graph of an embodiment signal flow in a MIMO interference cancellation algorithm.

FIG. 9 illustrates a theoretical component signal SNR as a function of observation window size. Results are shown for different number of estimation parameters (M), and different input SNRs (g). The fading rate is 3 Hz and the sample rate is 30.72 MHz for all results. Note that even at the upper end of FIG. 9, with a 20 MHz LTE signal, the observation window is still small (1%) relative to the fading rate.

Figure 10:
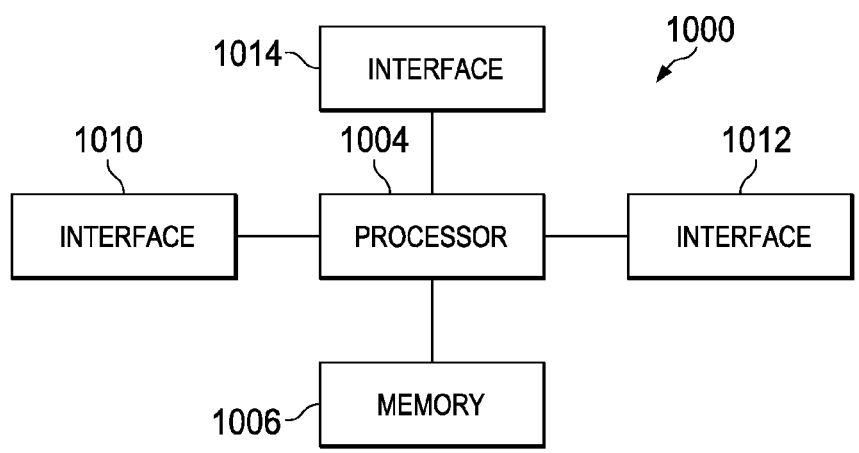
FIG. 10 illustrates a diagram of an embodiment communications device.

FIG. 10 illustrates a block diagram of an embodiment of a communications device 1000, which may be equivalent to one or more devices (e.g., UEs, NBs, etc.) discussed above. The communications device 1000 may include a processor 1004, a memory 1006, and a plurality of interfaces 1010, 1012, 1014, which may (or may not) be arranged as shown in FIG. 10. The processor 1004 may be any component capable of performing computations and/or other processing related tasks, and the memory 1006 may be any component capable of storing programming and/or instructions for the processor 1004. The interfaces 1010, 1012, 1014, may be any component or collection of components that allows the communications device 1000 to communicate with other devices.

Figure 11:
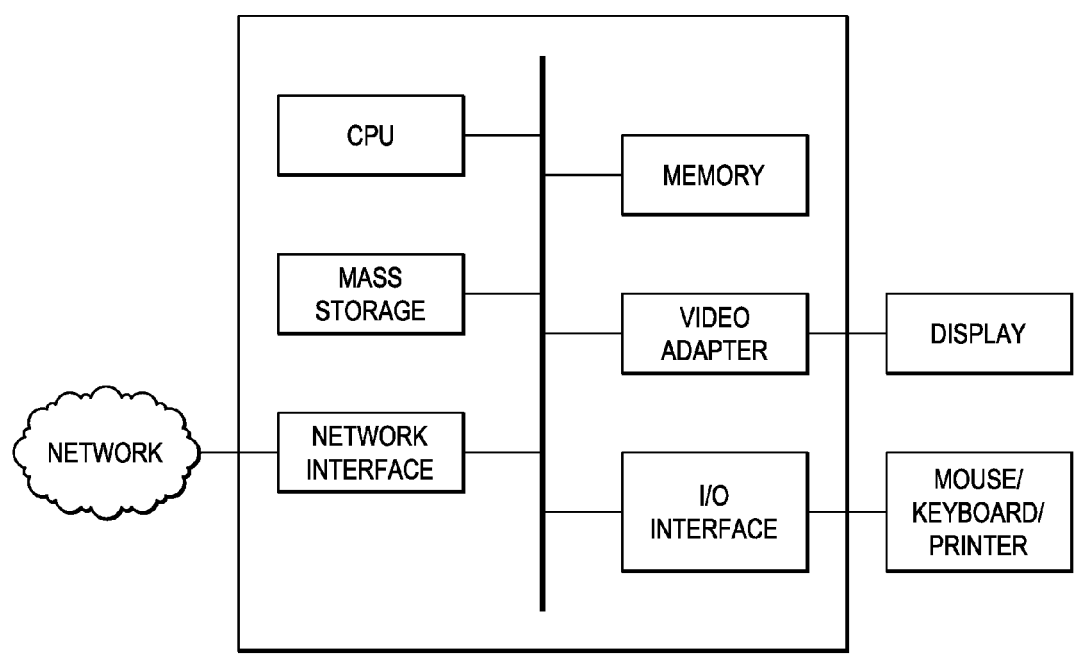
FIG. 11 illustrates a diagram of an embodiment computing platform.

FIG. 11 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs. In some embodiments, some or all of the components may be combined in a device comprising a field-programmable gate array (FPGA) or an application-specific integrated circuit (ASIC).

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer. It will be understood by those skilled in the art that many implementations of the above described embodiments will not require the presence of a video or direct I/O interface. The absence of such interfaces should not be seen as an unintended implementation, as a video adapter and I/O interface are purely optional components.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for receiving data in a multiple-input multiple-output (MIMO) full-duplex communication channel, the method comprising:
   receiving, by a device, a radio signal over a first antenna of a multi-antenna array, the radio signal including a received signal component corresponding to a communications signal being received over the MIMO full-duplex communication channel;
   obtaining baseband samples of transmission signals communicated over the MIMO full-duplex communication channel, the transmission signals including at least a first transmission signal emitted over the first antenna and a second transmission signal emitted over a second antenna of the multi-antenna array, wherein the baseband samples include a first baseband sample corresponding to the first transmission signal and a second baseband sample corresponding to the second transmission signal;
   performing channel estimation for the radio signal in accordance with the baseband samples to generate an interference-cancellation signal, the interference-cancellation signal including at least a first interference component corresponding to the first transmission signal and a second interference component corresponding to the second transmission signal, the first transmission signal being transmitted over the same antenna as the radio signal was received, the first transmission signal and the radio signal being non-orthogonal in the time, frequency, and code domains, wherein performing channel estimation for the radio signal in accordance with the baseband samples comprises correlating the second baseband sample with the radio signal to estimate a first interference channel associated with the second transmission signal, and deriving the second interference component from the first interference channel; and
   subtracting the interference cancellation signal from the radio signal to at least partially isolate the received signal component from interference in the radio signal.

2. The method of claim 1, wherein the communications signal, the first transmission signal, and the second transmission signal are communicated over common network resources of the MIMO full-duplex communication channel.

3. The method of claim 1, wherein the first interference channel corresponds to an air interface extending from the second antenna of the multi-antenna array to the first antenna of the multi-antenna array.

4. The method of claim 3, wherein the first antenna and the second antenna are used to perform a MIMO transmission over the same network resource on which the communications signal is received.

5. The method of claim 1, wherein performing channel estimation for the radio signal in accordance with the baseband samples further comprises:
   applying a least-squares algorithm to the radio signal in accordance with at least the first sample and the second sample to obtain at least a second interference channel associated with the first transmission signal and the first interference channel associated with the second interference channel; and
   estimating the interference-cancellation signal in accordance with at least the first interference channel and the second interference channel.

6. The method of claim 1, wherein performing channel estimation for the radio signal in accordance with the baseband samples further comprises:
   creating a data matrix from the baseband samples; and
   estimating the interference cancellation signal in accordance with the estimated first interference channel.

7. The method of claim 6, wherein estimating the interference cancellation signal in accordance with the data matrix comprises:
   performing least squares estimation on the data matrix and samples of the received radio signal to estimate the first interference channel.

8. The method of claim 7, wherein estimating the interference cancellation signal in accordance with the data matrix comprises:
   performing singular-value decomposition (SVD) on the data matrix or calculating the Moore-Penrose inverse of the data matrix to estimate the first interference channel.

9. The method of claim 1, wherein the multi-antenna array includes K antennas, where K is an integer greater than two, and wherein performing channel estimation for the radio signal comprises:
   correlating baseband samples of K transmission signals with the radio signal to estimate K interference channels, the K transmission signals being emitted simultaneously over the K antennas of the multi-antenna array as part of a MIMO transmission signal; and
   deriving the interference cancellation signal from the K interference channels.

10. The method of claim 1, wherein performing channel estimation for the radio signal in accordance with the baseband samples further comprises:
    correlating the first baseband sample with the radio signal to estimate a second interference channel associated with the first transmission signal; and
    deriving the first interference component from the second interference channel.

11. The method of claim 1, wherein performing channel estimation for the radio signal in accordance with the baseband samples further comprises estimating a first interference channel using an auxiliary receiver and an auxiliary transmitter coupled to the first antenna, and wherein subtracting the interference cancellation signal from the radio signal comprises subtracting the interference cancellation signal from the radio signal in analog domain using the auxiliary receiver and the auxiliary transmitter.

12. A communications device adapted for communicating via multiple-input multiple-output (MIMO) full-duplex communication channel, the communications device comprising:
    a processor; and
    a computer readable storage medium storing programming for execution by the processor, the programming including instructions to:
    receive a radio signal over a first antenna of a multi-antenna array, the radio signal including a received signal component corresponding to a communications signal received over the MIMO full-duplex communication channel;
    obtain baseband samples of transmission signals communicated over the MIMO full-duplex communication channel, the transmission signals including at least a first transmission signal emitted over the first antenna and a second transmission signal emitted over a second antenna of the multi-antenna array, wherein the baseband samples include a first baseband sample corresponding to the first transmission signal and a second baseband sample corresponding to the second transmission signal;

perform channel estimation for the radio signal in accordance with the baseband samples to generate an interference cancellation signal, the interference cancellation signal including at least a first interference component corresponding to the first transmission signal and a second interference component corresponding to the second transmission signal, the first transmission signal being transmitted over the same antenna as the radio signal was received, the first transmission signal and the radio signal being non-orthogonal in the time, frequency, and code domains; and subtract the interference cancellation signal from the radio signal to at least partially isolate the received signal component from interference in the radio signal, wherein the instructions to perform channel estimation for the radio signal in accordance with the baseband samples include instructions to estimate a first interference channel associated with the second transmission signal in accordance with the second baseband sample and samples of the received radio signal, and derive the second interference component from the first interference channel.

13. The communications device of claim 12, wherein the communications signal, the first transmission signal, and the second transmission signal are communicated over common network resources of the MIMO full-duplex communication channel.

14. The communications device of claim 12, wherein the first interference channel corresponds to an air interface extending from the second antenna of the multi-antenna array to the first antenna of the multi-antenna array.

15. The communications device of claim 14, wherein the first antenna and the second antenna are used to perform a MIMO transmission over the same network resource on which the communications signal is received.

16. The communications device of claim 12, wherein the multi-antenna array includes K antennas, where K is an integer greater than two, and wherein the instructions to perform channel estimation for the radio signal include instructions to:

estimating K interference channels in accordance with baseband samples of K transmission signals and the radio signal using a least-squares algorithm, the K transmission signals being emitted simultaneously over the K antennas of the multi-antenna array as part of a MIMO transmission signal; and derive the interference cancellation signal from the K interference channels.

17. A communications device adapted for communicating via multiple-input multiple-output (MIMO) full-duplex communication channel, the communications device comprising:

a multi-antenna array comprising at least a first antenna and a second antenna, the first antenna configured to receive a radio signal that includes a received signal component corresponding to a communications signal communicated over the MIMO full-duplex communication channel;

one or more transmission modules coupled to the multi-antenna array, the one or more transmission modules configured to perform a transmission over the MIMO full-duplex communication channel by emitting at least a first transmission signal over the first antenna and a second transmission signal over the second antenna; and a signal processing module coupled to the first antenna, the signal processing module configured to obtain at least a first baseband sample of the first transmission signal and a second baseband sample of the second transmission signal, and to perform interference cancellation on the radio signal using both the first baseband sample and the second baseband sample to at least partially isolate the received signal component from interference in the radio signal, the first transmission signal being transmitted over the same antenna as the radio signal was received, the first transmission signal and the radio signal being non-orthogonal in the time, frequency, and code domains, wherein the interference cancellation on the radio signal comprises:

estimating a first interference channel in accordance with the first baseband sample and an interference signal using a least-squares algorithm, the first interference channel being associated with the first transmission signal;

correlating the second baseband sample with the radio signal to estimate a second interference channel associated with the second transmission signal; and deriving an interference cancellation signal from at least the first interference channel and the second interference channel.

18. The communications device of claim 17, wherein the communications signal, the first transmission signal, and the second transmission signal are communicated over common network resources of the MIMO full-duplex communication channel.

19. The communications device of claim 17, wherein the second interference channel corresponds to an air interface extending from the second antenna of the multi-antenna array to the first antenna of the multi-antenna array.

20. The communications device of claim 17, wherein the multi-antenna array includes K antennas, where K is an integer greater than two, and the signal processing module is configured to perform interference cancellation on the radio signal by:

estimating K interference channels in accordance with baseband samples of K transmission signals and an interference signal using a least-squares algorithm, the K transmission signals being emitted simultaneously over the K antennas of the multi-antenna array as part of a MIMO transmission signal; and deriving the interference cancellation signal from the K interference channels.

21. A method for receiving data in a multiple-input multiple-output (MIMO) full-duplex communication channel, the method comprising:

receiving, by a device, a radio signal over a first antenna of a multi-antenna array, the radio signal including a received signal component corresponding to a communications signal being received over the MIMO full-duplex communication channel;

obtaining baseband samples of transmission signals communicated over the MIMO full-duplex communication channel, the transmission signals including at least a first transmission signal emitted over the first antenna and a second transmission signal emitted over a second antenna of the multi-antenna array;

performing channel estimation for the radio signal in accordance with the baseband samples to generate an interference-cancellation signal, the interference-cancellation signal including at least a first interference component corresponding to the first transmission signal and a second interference component corresponding to the second transmission signal, the first transmission signal being transmitted over the same antenna as the radio signal was received, the first transmission signal and the radio signal being non-orthogonal in the time, frequency, and code domains, wherein performing channel estimation for the radio signal in accordance with the baseband samples comprises correlating the baseband samples with the radio signal to estimate a first interference channel associated with the first transmission signal using an auxiliary receiver and an auxiliary transmitter coupled to the first antenna; and subtracting the interference cancellation signal from the radio signal to at least partially isolate the received signal component from interference in the radio signal, wherein subtracting the interference cancellation signal from the radio signal comprises subtracting the interference cancellation signal from the radio signal in analog domain using the auxiliary receiver and the auxiliary transmitter.

\* \* \* \* \*